(12) United States Patent
Hsu

(10) Patent No.: US 9,197,147 B2
(45) Date of Patent: Nov. 24, 2015

(54) DRIVER CIRCUIT AND THREE PHASE DIRECT CURRENT BRUSHLESS MOTOR

(71) Applicants: Fu-Tzu Hsu, Taipei (TW); Chien-Sen Tu, New Taipei (TW)

(72) Inventor: Fu-Tzu Hsu, Taipei (TW)

(73) Assignees: Fu-Tzu Hsu, Taipei (TW); Chien-Sen Tu, New Taipei (TW)

( * ) Notice: Subject to any disclaimer, the term of this patent is extended or adjusted under 35 U.S.C. 154(b) by 79 days.

(21) Appl. No.: 14/197,161

(22) Filed: Mar. 4, 2014

(65) Prior Publication Data

US 2014/0265947 A1 Sep. 18, 2014

(30) Foreign Application Priority Data

Mar. 15, 2013 (TW) .............................. 102204786 U

(51) Int. Cl.
*H02P 1/00* (2006.01)
*H02P 6/14* (2006.01)
*H02P 25/18* (2006.01)

(52) U.S. Cl.
CPC ................ *H02P 6/14* (2013.01); *H02P 25/184* (2013.01)

(58) Field of Classification Search
USPC .................. 318/400.01, 400.26, 400.29, 700
See application file for complete search history.

(56) References Cited

U.S. PATENT DOCUMENTS

| 3,975,668 | A | * | 8/1976 | Davie | 318/762 |
|---|---|---|---|---|---|
| 3,991,354 | A | * | 11/1976 | Rosa et al. | 318/800 |
| 4,435,673 | A | * | 3/1984 | Hagino et al. | 318/400.38 |
| 6,630,805 | B2 | * | 10/2003 | Makaran | 318/400.26 |
| 2008/0278967 | A1 | * | 11/2008 | Furmanczyk | 363/3 |
| 2011/0234136 | A1 | * | 9/2011 | Ramu | 318/438 |
| 2012/0049770 | A1 | * | 3/2012 | Bouchez et al. | 318/139 |
| 2012/0158245 | A1 | * | 6/2012 | Yoshizawa et al. | 701/36 |
| 2013/0121029 | A1 | * | 5/2013 | Coors et al. | 363/13 |

* cited by examiner

*Primary Examiner* — Kawing Chan
(74) *Attorney, Agent, or Firm* — DLA Piper LLP (US)

(57) ABSTRACT

A driver circuit for a three phase direct current (DC) brushless motor include: three bridge arms each having a first switch, a second switch, and a first diode and a second diode respectively and electrically coupled with the first switch and the second switch in parallel, and three capacitor arms each having a first capacitor and a second capacitor to electrically couple a center tap of a corresponding phase coil of the DC brushless motor to a respective on of positive and negative terminals of a DC power supply.

4 Claims, 5 Drawing Sheets

DRIVER CIRCUIT AND THREE PHASE DIRECT CURRENT BRUSHLESS MOTOR

CROSS-REFERENCE TO RELATED APPLICATION

This application claims priority of Taiwanese application no. 102204786, filed on Mar. 15, 2013.

BACKGROUND OF THE INVENTION

1. Field of the Invention

The present invention relates to a motor driver circuit and a three phase direct current brushless motor.

2. Description of the Related Art

FIG. 1 illustrates a conventional three phase brushless direct current (DC) motor driver circuit 1. Three phase coils Lu, Lv, Lw of the three phase brushless DC motor are electrically connected to each other in a Y circuit configuration, wherein terminals on one end of the three phase coils Lu, Lv, Lw are electrically connected to each other (contact n), and the terminals on the other end (contacts U, V, W) are electrically connected with the drive circuit 1. Driver circuit 1 has three bridge arms coupled in parallel with a DC power supply Vdc (hereinafter referred to as the U-phase, V-phase and W-phase bridge arms). Each bridge arm has an upper switch U+, V+, W+, a lower switch U−, V−, W− and two flywheel diodes D each electrically coupled with a respective one of the upper and lower switches in parallel. The contacts U, V, W of the three phase coils Lu, Lv, Lw are electrically connected between the upper switch U+, V+, W+ and the lower switch U−, V−, W−, of the bridge arms, respectively.

The drive circuit 1 controls, for example, upper switch U+ of the U-phase bridge arm and the lower switch V− of the V-phase bridge arm to be switched on in a basic cycle. This enables the U-phase coil Lu, and the V-phase coil Lv and the power supply Vdc (see FIG. 2), generating a magnetic force for driving a rotor of the DC brushless motor.

At the end of the basic cycle, the upper switch U+ and the lower switch V− are switched off (see FIG. 3), and back electromotive forces eu,ev are instantly produced by the phase coils Lu, Lv. A large current attributed to the back electromotive forces eu,ev will pass through the flywheel diode D coupled in parallel with the upper switch V+ and the flywheel diode D coupled in parallel with the lower switch U−, applying a high voltage surge across the power supply Vdc that may easily damage the same.

Referring to FIG. 4, a conventional solution to the above-mentioned problem is to provide a dissipating resistor R controlled by a switch SW to make or break parallel connection with the power supply Vdc. At the instant the upper switch U+ and the lower switch V− are switched off, the switch SW connects the Resistor R with the power supply Vdc in parallel to achieve an effect of lowering the voltage across the power supply Vdc. This protects the power supply Vdc from the instantaneous high voltage attributed to back electromotive forces eu, ev.

Although such an approach may suppress the high voltage attributed to back electromotive forces, power of the power supply Vdc is dissipated by the dissipating resistor R in vain and consumption of power of the power supply VDC is accelerated.

Since the back electromotive forces cannot be stored by the power supply Vdc as it has an alternating current form, the energy dissipated will cause temperature to rise in the driver circuit 1, and such high temperature will shorten the service life of the power supply Vdc (usually a battery).

In addition, as compared to the delta circuit configuration, the currents in the Y circuit configuration are smaller and thus the mechanical power outputted by the motor is smaller. However, if the delta circuit configuration is used, the back electromotive forces produced will be greater than that of the Y circuit configuration, which is unfavorable for the driver circuit 1. Therefore, the conventional driver circuit 1 is not suited for the delta circuit configuration.

SUMMARY OF THE INVENTION

The object of the present invention is to provide a driver circuit for a three phase direct current (DC) brushless motor with a delta circuit configuration and that can store energy of back electromotive forces.

According to one aspect of the present invention, there is provided a driver circuit for a three phase direct current (DC) brushless motor. The three phase DC brushless motor includes a stator having three phase coils that are electrically connected to each other in a delta circuit configuration. The delta circuit configuration has three contacts and each of the phase coils has a center tap. The driver circuit is adapted to be electrically coupled with a DC power supply and includes:

three bridge arms each having a first switch, a second switch electrically coupled with the first switch in series, a first diode electrically coupled with the first switch in parallel, and a second diode electrically coupled with the second switch in parallel, the first diode having a cathode to be electrically coupled with a positive terminal of the DC power supply, the second diode having an anode to be electrically coupled with a negative terminal of the DC power supply, a junction of the first switch and the second switch of each of the bridge arms to be electrically coupled to a respective one of the three contacts; and three capacitor arms each having a first capacitor to electrically couple the center tap of a corresponding one of the phase coils to the positive terminal of the DC power supply, and a second capacitor to electrically couple the center tap of the corresponding one of the phase coils to the negative terminal of the DC power supply.

When the first switch of a first one of the bridge arms is switched on and the second switch of a second one of the bridge arms is switched on, the phase coil electrically coupled between the first switch and the second switch that are switched on is configured to store energy from the DC power supply to become an energy storing phase coil, and when the first switch and the second switch that are switched on are subsequently switched off, back electromotive forces produced by the energy storing phase coil are discharged through the second diode electrically coupled in parallel with the second switch of the first one of the bridge arms and the second capacitor that is disposed to electrically couple the center tap of the energy storing phase coil to the negative terminal of the DC power supply, and through the first diode electrically coupled in parallel with the first switch of the second one of the bridge arms and the first capacitor that is disposed to electrically couple the center tap of the energy storing phase coil to the positive terminal of the DC power supply.

Another object of the present invention is to provide a three phase direct current (DC) brushless motor that includes the driver circuit of this invention.

According to another aspect of the present invention, a three phase direct current (DC) brushless motor is configured to be driven by a DC power supply, and includes:

a rotor;

a stator having three phase coils that are electrically connected to each other in a delta circuit configuration, the delta circuit configuration having three contacts each of the phase coils having a center tap; and a driver circuit including:

three bridge arms each having a first switch, a second switch electrically coupled with the first switch in series, a first diode electrically coupled with the first switch in parallel, and a second diode electrically coupled with the second switch in parallel, the first diode having a cathode to be electrically coupled with a positive terminal of the DC power supply, the second diode having an anode to be electrically coupled with a negative terminal of the DC power supply, a junction of the first switch and the second switch of each of the bridge arms being electrically coupled to a respective one of the three contacts; and three capacitor arms each having a first capacitor disposed to electrically couple the center tap of a corresponding one of the phase coils to the positive terminal of the DC power supply, and a second capacitor disposed to electrically couple the central tap of the corresponding one of the phase coils to the negative terminal of the DC power supply.

When the first switch of a first one of the bridge arms is switched on and the second switch of a second one of the bridge arms is switched on, the phase coil electrically coupled between the first switch and the second switch that are switched on is configured to store energy from the DC power supply to become an energy storing phase coil, and when the first switch and the second switch that are switched on are subsequently switched off, back electromotive forces produced by the energy storing phase coil are discharged through the second diode electrically coupled in parallel with the second switch of the first one of the bridge arms and the second capacitor that is disposed to electrically couple the center tap of the energy storing phase coil to the negative terminal of the DC power supply, and through the first diode electrically coupled in parallel with the first switch of the second one of the bridge arms and the first capacitor that is disposed to electrically couple the center tap of the energy storing phase coil to the positive terminal of the DC power supply.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 5:
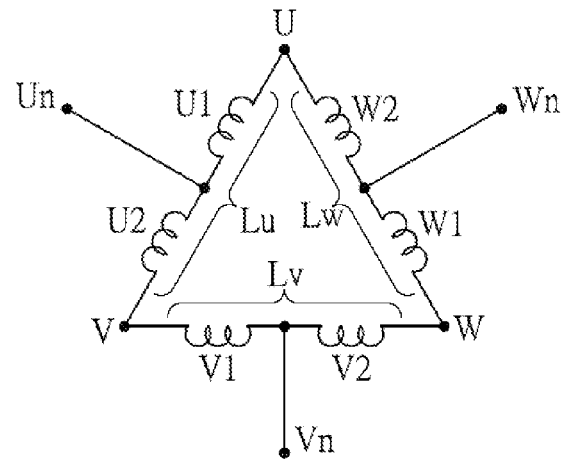
FIG. 5 is a three-phase coil winding diagram illustrating a stator having three phase coils Lu, Lv, Lw that are electrically connected to each other in a delta circuit configuration.
Figure 6:
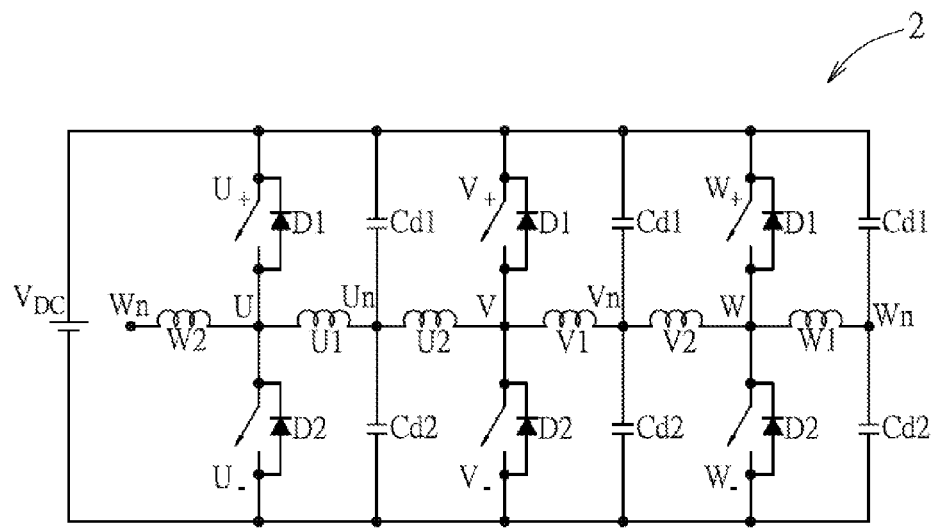
FIG. 6 is a circuit diagram illustrating a driver circuit for a three phase direct current (DC) brushless motor in a preferred embodiment of the present invention.

FIG. 5 and FIG. 6 illustrates a preferred embodiment of a driver circuit 2 of a three phase DC brushless motor of the present invention.

As shown in FIG. 5, three phase coils Lu, Lv, Lw in the three phase DC brushless motor stator (not shown) are electrically connected to each other in a delta circuit configuration. Therefore, the three phase coils Lu, Lv, Lw are electrically connected to have three contacts U, V, W. The three phase coils Lu, Lv, Lw have center taps Un, Vn, Wn in the middle of coil sections U1, U2, coil sections V1, V2, and coil sections W1, W2, respectively.

Referring to FIG. 6, the driver circuit 2 is electrically coupled with the direct current (DC) power supply Vdc, and includes three bridge arms (U-phase, V-phase and W-phase bridge arms) electrically coupled with the DC power supply Vdc in parallel and three capacitor arms each having a first capacitor cd1 electrically coupling the center tap Un, Vn, Wn of a corresponding one of the phase coils Lu, Lv, Lw to the positive terminal of the DC power supply Vdc, and a second capacitor Cd2 electrically coupling the center tap Un, Vn, Wn of the corresponding one of the phase coils Lu, Lv, Lw to the negative terminal of the DC power supply Vdc. Each of the bridge arms includes a first switch U+, V+, W+, a second switch U−, V−, W−, electrically coupled with the first switch U+, V+, W+ in series, a first diode D1 electrically coupled with the first switch U+, V+, W+ in parallel, and a second diode D2 electrically coupled with the second switch U−, V−, W− in parallel. Each first diode D1 has a cathode electrically coupled with the positive terminal of the DC power supply Vdc, and an anode electrically coupled with a cathode of the corresponding second diode D2. Each second diode D2 has an anode electrically coupled with the negative terminal of the DC power supply Vdc. The contacts U, V, W are electrically connected to a respective one of a junction of the first switch U+ and the second switch DU−, a junction of the first switch V+ and the second switch V−, and a junction of the first switch W+ and the second switch W−.

Figure 7:
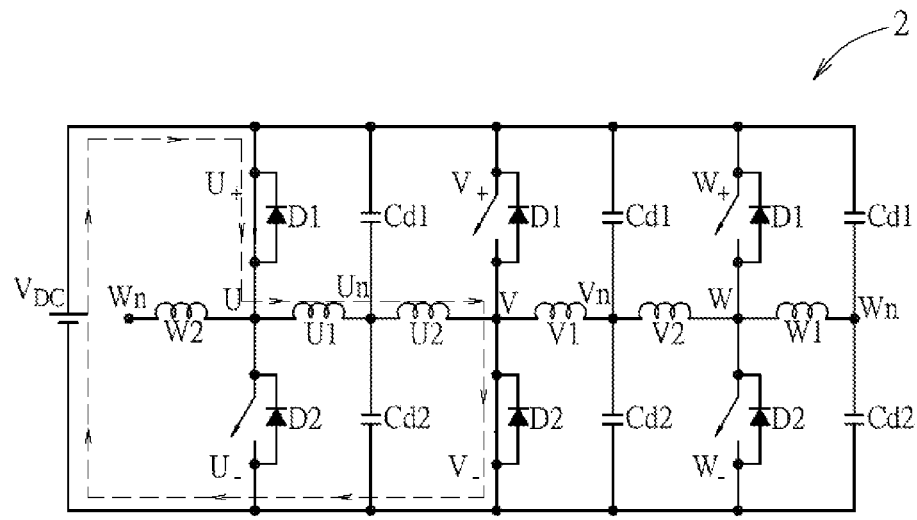
FIG. 7 is a circuit operation diagram illustrating a driving operation of the driver circuit in the preferred embodiment.
Figure 8:
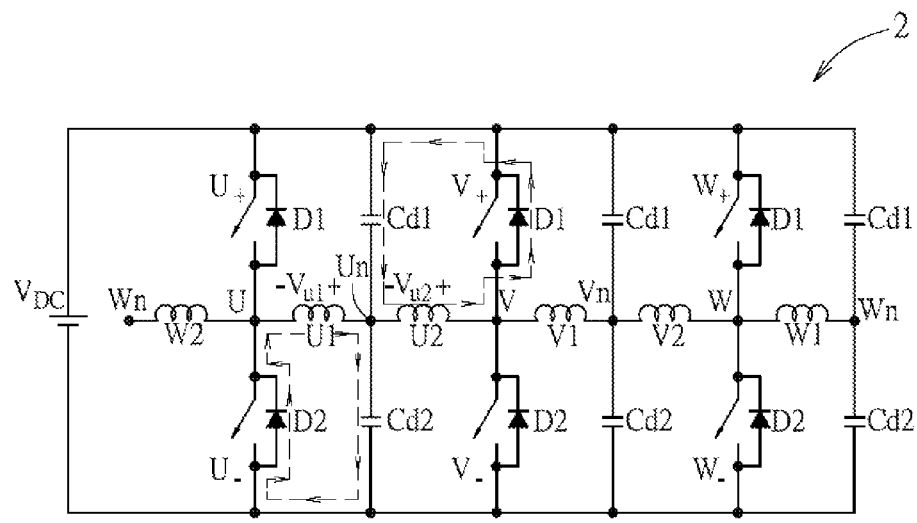
FIG. 8 is a circuit operation diagram illustrating another driving operation of the driver circuit in the preferred embodiment.

FIG. 7 shows an example of the driver circuit 2 operating with the phase coil Lu in a basic cycle. In this example, when the first switch U+ of the U-phase bridge arm and the second switch V− of the V-phase bridge arm are switched on, the phase coil Lu electrically connected between the first switch U+ and the second switch V− produces magnetic force that drives a rotor, and the phase coil Lu stores energy from the DC power supply Vdc. Therefore, as shown in FIG. 8, when the driver circuit 2 controls the first switch U+ and the second switch V− to be switched off, the coil sections U1, U2 generate back electromotive forces Vu1, Vu2. The current produced by the back electromotive force Vu1 will, by taking the shortest path through the second diode D2 in parallel with the second switch U−, charge the second capacitor Cd2 electrically connected between the center tap Un and the negative terminal of the DC power supply Vdc. Similarly, the current produced by the back electromotive force Vu2 will, by taking the shortest path through the first diode D1 in parallel with the first switch V+, charge the first capacitor Cd1 electrically connected between the center tap Un and the positive terminal of the DC power supply Vdc. As a result, the currents generated by the back electromotive forces do not flow through the DC power supply Vdc, preventing damage to the DC power supply Vdc. Moreover, the energy of the back electromotive forces is stored in the capacitors Cd1, Cd2 for future use. Since the capacitors Cd1, Cd2 are capable of storing the energy of the back electromotive forces, the temperature rise in the driver circuit 2 can be regulated, preventing shortening of the lifespan of the DC power supply Vdc due to high temperature.

The driver circuit 2 turns the switches of the U-phase, V-phase and W-phase bridge arms on and off for sequentially connecting the three phase coils Lu, Lv, Lw the DC power supply for driving the rotor, and whenever the switches are switched from an on state to an off state, the back electromotive forces produced in one of the three phase coil Lu, Lv, Lw charges the first and second capacitors Cd1, Cd2 of the capacitor arm connected thereto.

Since the switching speed of the first switch and second switch of each bridge arm is very fast, which is about 400 Hz, the capacitors Cd1, Cd2 can be chosen as non-polarity medium frequency (300 hz~1 KHz) capacitors. When the driver circuit 2 is in operation, the back electromotive forces produced by each of the three phase coils Lu, Lv, Lw will charge the capacitors Cd1, Cd2 in sequence, maintaining the electrical energy stored in the capacitors Cd1, Cd1. Thus, when the DC power supply Vdc is a rechargeable battery, and a series voltage across the first capacitor Cd1 and the second capacitor Cd2 of one of the capacitor arms is higher than a voltage across the DC power supply Vdc, the first capacitor Cd1 and the second capacitor Cd2 of the one of the capacitor arms may charge the rechargeable battery, prolonging the battery life of the DC power supply Vdc.

Figure 1:
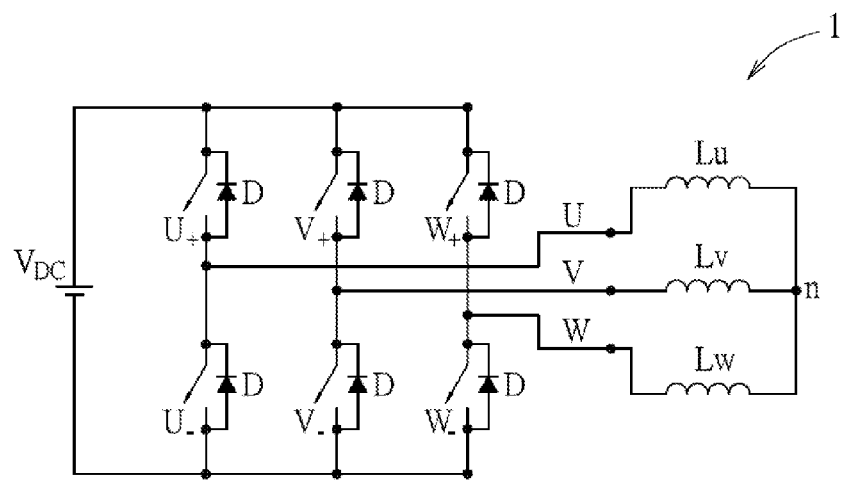
FIG. 1 is a circuit diagram illustrating a conventional three-phase brushless DC motor driver circuit.
Figure 2:
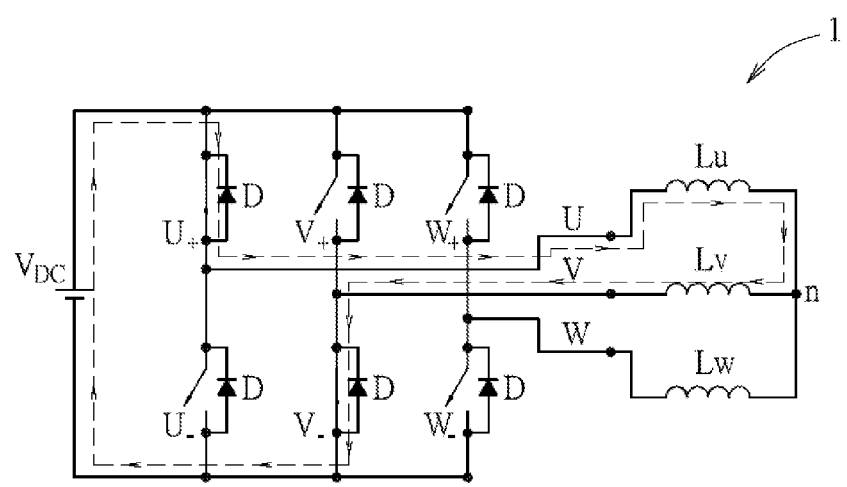
FIG. 2 is a circuit operation diagram illustrating a driving operation of the conventional three-phase brushless DC motor drive circuit.
Figure 3:
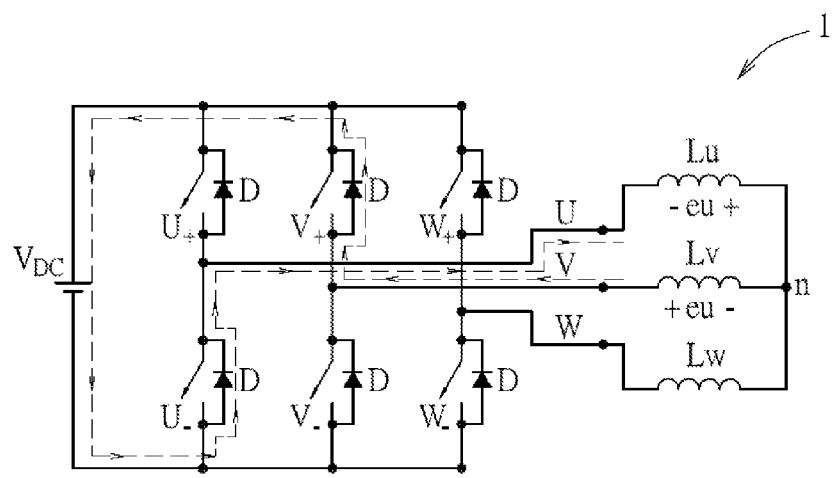
FIG. 3 is a circuit operation diagram illustrating another driving operation of the conventional three-phase brushless DC motor driver circuit.
Figure 4:
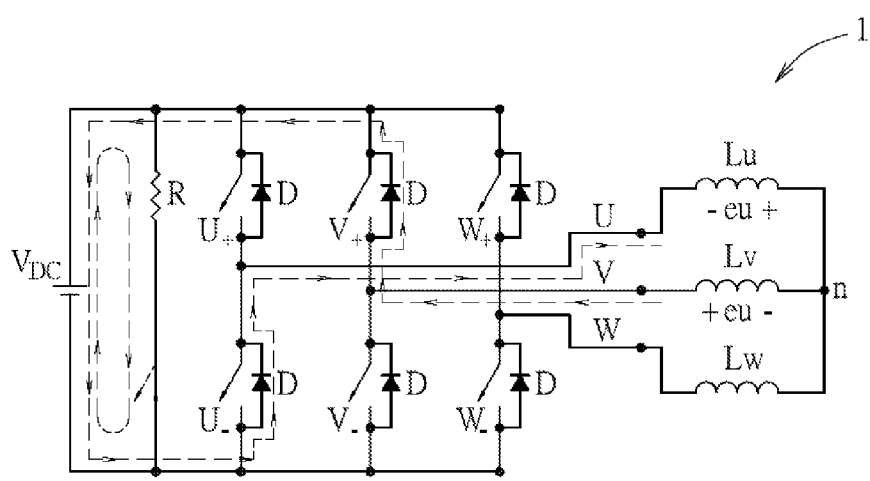
FIG. 4 is a circuit operation diagram illustrating the conventional three-phase brushless DC motor driver circuit modified to include a dissipating resistor.

Moreover, the driver circuit 2 in this embodiment does not require a dissipating resistor R used in the prior art as shown in FIG. 4, and thus power dissipation is minimized.

Figure 9:
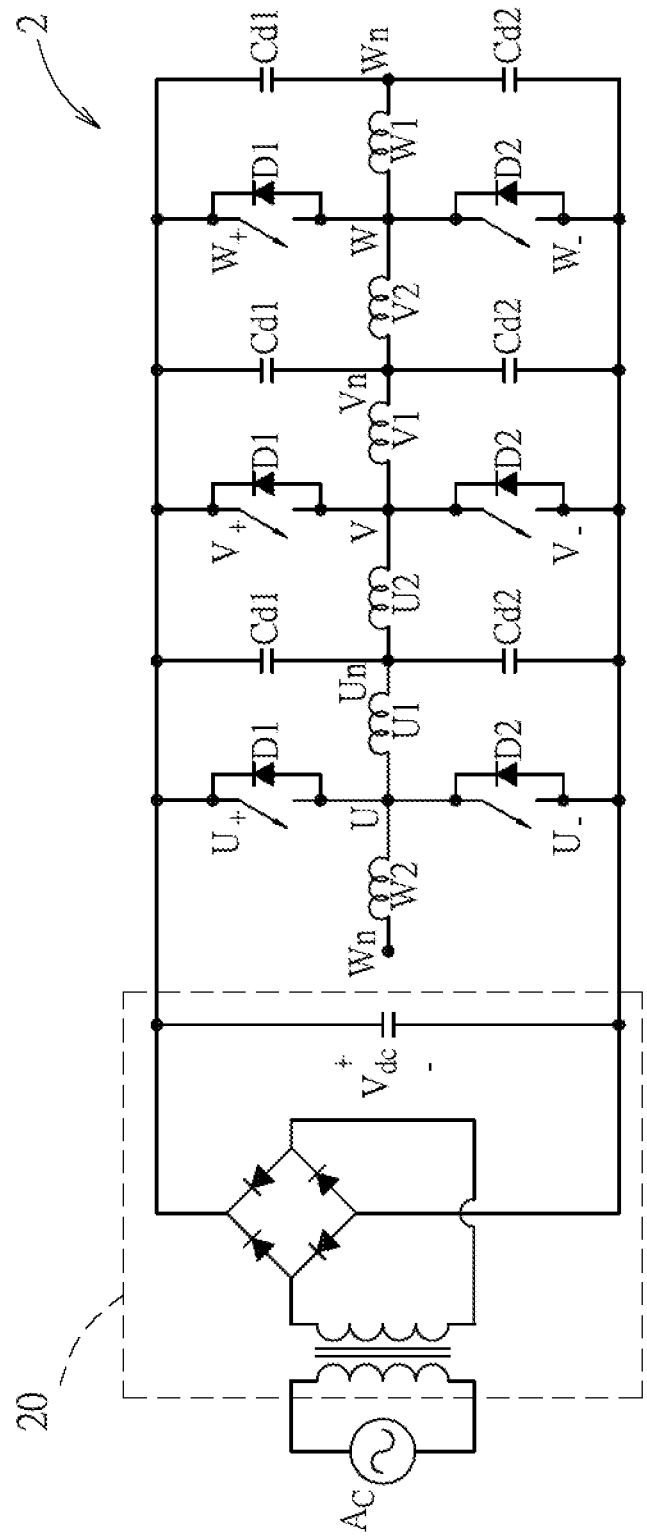
FIG. 9 is a circuit diagram illustrating the driver circuit in the preferred embodiment when used with a rectifier filter circuit.

As shown in FIG. 9, a rectifier filter circuit may be electrically coupled with the driver circuit 2. For instance, a bridge rectifier filter circuit 20 that filters an alternating current (AC) signal from an AC power source may serve as the DC power source of the driver circuit 2.

In summary, each of the first capacitors Cd1 that is electrically coupled between the corresponding center tap Un, Vn, Wn and the positive terminal of the DC power supply Vdc and each of the capacitors Cd1 that is electrically coupled between the corresponding center tap Un, Vn, Wn and the negative terminal of the DC power supply Vdc are charged by the back electromotive forces through the corresponding first and second diodes D1, D2 to prevent the DC power supply Vdc from high voltage impacts from the back electromotive forces. This invention can be implemented in the three phase DC brushless motor stator having the delta circuit configuration, and the electrical energy stored in the capacitors Cd1, Cd2 can provide power to the DC power supply Vdc for prolonging battery life or power boosting when the motor is outputting a high amount of torque.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A driver circuit for a three phase direct current (DC) brushless motor, the three phase DC brushless motor including a stator having three phase coils that are electrically connected to each other in a delta circuit configuration, the delta circuit configuration having three contacts, each of the phase coils having a center tap, the driver circuit being adapted to be electrically coupled with a DC power supply and comprising:

three bridge arms each having a first switch, a second switch electrically coupled with the first switch in series, a first diode electrically coupled with the first switch in parallel, and a second diode electrically coupled with the second switch in parallel, the first diode having a cathode to be electrically coupled with a positive terminal of the DC power supply, the second diode having an anode to be electrically coupled with a negative terminal of the DC power supply, a junction of the first switch and the second switch of each of the bridge arms to be electrically coupled to a respective one of the three contacts; and three capacitor arms each having a first capacitor to electrically couple the center tap of a corresponding one of the phase coils to the positive terminal of the DC power supply, and a second capacitor to electrically couple the center tap of the corresponding one of the phase coils to the negative terminal of the DC power supply;

wherein when the first switch of a first one of the bridge arms is switched on and the second switch of a second one of the bridge arms is switched on, the phase coil electrically coupled between the first switch and the second switch that are switched on is configured to store energy from the DC power supply to become an energy storing phase coil, and when the first switch and the second switch that are switched on are subsequently switched off, back electromotive forces produced by the energy storing phase coil are discharged through the second diode electrically coupled in parallel with the second switch of the first one of the bridge arms and the second capacitor that is disposed to electrically couple the center tap of the energy storing phase coil to the negative terminal of the DC power supply, and through the first diode electrically coupled in parallel with the first switch of the second one of the bridge arms and the first capacitor that is disposed to electrically couple the center tap of the energy storing phase coil to the positive terminal of the DC power supply.

2. The driver circuit as claimed in claim 1, the DC power supply being a rechargeable battery, wherein the first capacitor and the second capacitor of one of the capacitor arms are configured to charge the rechargeable battery when a series voltage across the first capacitor and the second capacitor of said one of the capacitor arms is higher than a voltage across the rechargeable battery.

3. A three phase direct current (DC) brushless motor configured to be driven by a DC power supply, the three phase DC brushless motor comprising:

a rotor;

a stator having three phase coils that are electrically connected to each other in a delta circuit configuration, the delta circuit configuration having three contacts, each of the phase coils having a center tap; and a driver circuit including:

three bridge arms each having a first switch, a second switch electrically coupled with the first switch in series, a first diode electrically coupled with the first switch in parallel, and a second diode electrically coupled with the second switch in parallel, the first diode having a cathode to be electrically coupled with a positive terminal of the DC power supply, the second diode having an anode to be electrically coupled with a negative terminal of the DC power supply, a junction of the first switch and the second switch of each of the bridge arms being electrically coupled to a respective one of the three contacts; and three capacitor arms each having a first capacitor disposed to electrically couple the center tap of a corresponding one of the phase coils to the positive terminal of the DC power supply, and a second capacitor disposed to electrically couple the central tap of the corresponding one of the phase coils to the negative terminal of the DC power supply;

wherein when the first switch of a first one of the bridge arms is switched on and the second switch of a second one of the bridge arms is switched on, the phase coil electrically coupled between the first switch and the second switch that are switched on is configured to store energy from the DC power supply to become an energy storing phase coil, and when the first switch and the second switch that are switched on are subsequently switched off, back electromotive forces produced by the energy storing phase coil are discharged through the second diode electrically coupled in parallel with the second switch of the first one of the bridge arms and the second capacitor that is disposed to electrically couple the center tap of the energy storing phase coil to the negative terminal of the DC power supply, and through the first diode electrically coupled in parallel with the first switch of the second one of the bridge arms and the first capacitor that is disposed to electrically couple the center tap of the energy storing phase coil to the positive terminal of the DC power supply.

4. The three phase DC brushless motor as claimed in claim 3, the DC power supply being a rechargeable battery, wherein the first capacitor and the second capacitor of one of the capacitor arms are configured to charge the rechargeable battery when a series voltage across the first capacitor and the second capacitor of said one of the capacitor arms is higher than a voltage across the rechargeable battery.

* * * * *